United States Patent [19]

Klinkowski

[11] Patent Number: 4,569,739

[45] Date of Patent: Feb. 11, 1986

[54] ELECTROFILTER USING AN IMPROVED ELECTRODE ASSEMBLY

[75] Inventor: Peter R. Klinkowski, Norwalk, Conn.

[73] Assignee: Dorr-Oliver Incorporated, Stamford, Conn.

[21] Appl. No.: 688,092

[22] Filed: Dec. 31, 1984

[51] Int. Cl.$^4$ ............................................. B01D 13/02
[52] U.S. Cl. ............................... 204/180.1; 204/186; 204/299 R; 204/302
[58] Field of Search ..................... 210/638, 748, 243; 204/180.1, 186, 299 R, 302, 301

[56] References Cited

U.S. PATENT DOCUMENTS

| | | | |
|---|---|---|---|
| 3,268,441 | 8/1966 | Lindstrom | 210/638 |
| 3,664,940 | 5/1972 | Greyson et al. | 204/180.1 |
| 4,013,554 | 3/1977 | Reis et al. | 210/243 X |
| 4,149,957 | 4/1979 | Gibson et al. | 204/299 R |
| 4,284,492 | 8/1981 | Korn | 204/299 R |
| 4,331,525 | 5/1982 | Huba et al. | 204/180.1 |

Primary Examiner—Thomas Wyse
Attorney, Agent, or Firm—Burtsell J. Kearns; Gary R. Plotecher; Paul D. Greeley

[57] ABSTRACT

A system and method for dewatering or separating particles from a liquid or a colloidal suspension which comprises the use of an electrofilter with separated, submerged electrodes wherein the electrode used for collecting the solid particles comprises an assembly of an ion-selective membrane shell, coated with or having bonded on its interior, a conductive metal composite catalyst layer, and a conductive structural material core such as graphite within the shell. The electrode assembly does not require the use of an electrolytic solution within the shell, but may be operated with one. A direct current is applied to the electrofilter so that the particles in the suspension will migrate towards the electrode assembly and form a caked deposit or slurry layer on the outside of the membrane. In one embodiment, the electrode assembly can be removed from the electrofilter cell so that the dewatered or separated solids may be removed from the outside surfaces of the membrane.

19 Claims, 2 Drawing Figures

ELECTROFILTER USING AN IMPROVED ELECTRODE ASSEMBLY

BACKGROUND OF THE INVENTION

This invention relates to a system and method for dewatering or separating particles from a liquid or colloidal suspension which uses an electrofilter with an improved electrode assembly for attracting the particles.

Nearly all phase boundaries exhibit an electric charge. This is due to the asymmetric forces acting on the interface. Such surface charges impart properties to particles which are different from the bulk material. For instance, a dispersion of very fine particles in water will not settle because the downward force due to gravity is less than the upward repulsive forces due to the surface charge of the particles.

If solid particles are dispersed in a liquid so that they acquire a surface charge, and an external electric field is applied, the particles will be attracted towards the electrode of opposite charge and repelled by the electrode of like charge. If the particle is free to move, the motion imparted by the electrical gradient is called "Electrophoresis". If the particle is restrained, then the liquid will move relative to the particle so that relative to the liquid, the particle appears to be moving. This phenomenon is called "Electro-osmosis".

The rate of movement of the particles and/or liquid is proportional to the intensity of the applied electric field and the magnitude of charge at the particle/liquid interface. That surface charge can be modified by changing the composition of the solid or liquid including such properties as pH, conductivity, and the addition of other materials.

An electrochemical cell is formed by the juxtaposition of electronic and electrolytic conductors so that as electricity is passed from the electronic conductor, such as a metal, to the electrolytic conductor, such as an acid, base, or salt solution, a chemical reaction occurs at their interface. The electronic-electrolytic interface at which oxidation occurs is known as the anode or positive electrode and that at which reduction occurs is known as the cathode or negative electrode.

When charged particles are placed between the anode and cathode of the electrochemical cell, the particles will tend to migrate towards an electrode as a function of their charge. For example, kaolin clay particles are negatively charged so they migrate towards the anode. Water molecules tend to move towards the cathode by electro-osmosis. Accordingly, a kaolin clay suspension can be "dewatered" by placing the clay suspension within an electrochemical cell and applying a direct current. The clay particles settle or deposit on the anode surface and on each other, displacing water or liquid molecules to form a more dense cake layer or slurry with a higher solids content than that of the liquid or aqueous suspension. The anode is removed from the cell and the dense layer of clay particles is recovered by removing the layer from the anode. The water is collected or removed at the cathode.

Since the rate of migration of the particles is a function of current density, it would seem desirable to apply as much current as is possible. However, since the generation of acid ($H^+$) and base ($H^-$) by hydrolysis of water molecules and the amount of oxidation at the anode is propotional to the amount of current, the applied current is limited to reduce these reactions which would otherwise shorten the electrode life.

It is, therefore, desirable to provide electrodes which are highly conductive, efficient and resistant to acid and oxidation. Costs should also be as low as possible since the electrode must be replaced if it corrodes. Much work has been directed towards electrode assemblies which will provide maximum performance at minimum costs. Alteration of other aspects of the system has also been explored. For example, the electrolyte may be continuously replenished so that the reaction products are removed or neutralized.

An example of a dewatering system utilizing the method of placing a suspension between electrodes and applying an electrical current is described by U.S. Pat. No. 4,367,132 to Bell et al. In this method, dewatering of chemically precipitated sludge is achieved by passing direct electric current through the sludge between a pair of submerged perforated electrodes. As a result of this treatment, the liquid phase of the sludge flows by electroosmosis towards the cathode where it is collected after passing through the perforated cathode. Additional liquid is accumulated at the perforated anode where it diffuses as the sludge solids accumulate on the anode. Since the anode may be consumed in the process, the perforated electrodes used in this method are relatively simple metal sheets preferably constructed of low cost materials such as iron, aluminum or graphite. The electrodes are optionally covered with a liquid porous, non-conductive membrane made of a material such as polypropylene or rayon fabric to prevent the sludge material from clogging the electrode. (See column 5, lines 5–27 of the '132 patent.)

In an important commercial application of electrofiltration, as applied to the separation of kaolin clay particles, it has been found that a titanium electrode, in the form of a sheet to which an expensive protective coating of an acid and oxidation resistant conductive metal catalyst is applied, is the only electrode that is practical. This electrode is very expensive because it is formed of titanium and the protective coating of acid and oxidation resistant metal catalyst costs about $100 per square foot. The function of the coating is to protect the titanium backbone from the corrosive environment of the electrofilter. It does this by catalyzing an electrode reaction such as the hydrolysis of water at a lower potential than that which would oxidize the base metal. In practice, however, the protective coating material does slowly erode, or deactivate, revealing the titanium backbone which then erodes. The replacement cost of these electrodes is substantial. It is therefore desirable to eliminate the need for a separate electrode element within the shell which would otherwise have to be formed of a material that is acid and oxidation resistant, such as the coated titanium.

Various electrode assemblies for use in electrolysis cells, which are more resistant to corrosion, are described in U.S. Pat. Nos. 4,191,618 to Coker et al., 4,323,435 to Carlin and 4,360,416 to Davidson et al. These electrodes are constructed by bonding metal composites to the surface of ion-exchange membranes and are known as solid polymer electrolyte assemblies. The metal composite generally contains at least a catalytic material such as a platinum group metal oxide and optionally a manganese or valve metal oxide to improve stability to oxidation and/or a hydrophobic compound such as Teflon. The ion exchange membrane transports cations generated during electrolysis at the anode so that the cations may move towards the cathode, while the membrane remains substantially impermeable to the flow of liquid. Back migration of the caustic (OH⁻) to the anode is prevented since anions are unable to pass through this type of membrane. These electrode assemblies are more resistant to corrosion, but have been limited to use within electroylysis cells where the anode and cathode are almost adjacent and are separated only by the ion selective membrane.

Variables effecting the performance of an electrode in an electrochemical cell include the surface area of the electrode, the presence of and nature of a catalyst metal and/or conductive metal, contaminants in the reactants, and the nature of the reactions taking place in the cell. Consequently, it is difficult to predict the applicability of an electrode useful in one electrochemical cell system to a different system even though one type of electrode may produce advantageous results in one type of electrochemical cell system. It does not always follow that such an improvement will be realized when the same electrode is utilized in a different electrochemical cell system. It is always desirable not only to improve the stability of the electrode and other elements of the electrochemical cells, but to improve the efficiency of the electrochemical cells in the processes carried out therein.

Accordingly, it is an object of the present invention to provide an electrofilter with an electrode assembly which is minimally affected by adverse reaction products such as acid and caustic, and therefore has a long life.

Another object of the present invention is to provide an electrofilter with an electrode assembly that is inexpensive to manufacture and operate.

A further object of the present invention is to provide an efficient and inexpensive method for the dewatering or separation of particles from a liquid or colloidal suspension by employing an electrofilter with an improved electrode assembly.

SUMMARY OF THE INVENTION

To overcome the problems of the prior art, the electrofilter of the present invention contains an improved electrode assembly containing an ion-selective membrane material shell which is coated or bonded on its interior with a metal composite layer and structurally supported by a conductive core material.

The electrofilter of the present invention is useful for the dewatering or separation of particles in a liquid or colloidal suspension by utilizing the inherent charge of the suspended particles. For example, in the dewatering of kaolin clay, the clay particles have a negative charge and migrate towards the anode when an electric current is applied to the electrofilter by means of the submerged, spaced electrodes. The clay particles build up on the outside surfaces of the electrode assembly, forming a cake or concentrated slurry layer. The electric current hydrolyzes some of the water molecules, forming acid ions (H⁺) and oxygen gas at the anode and alkali ions (OH⁻) and hydrogen gas at the cathode.

The electrofilter of the present invention contains at least one membrane electrode assembly. Other electrodes, common to the art, may be employed as a counter electrode to the membrane electrode assembly of the present invention. There may be several electrode assemblies and/or counter electrodes, preferably positioned in series, which may be removed from the electrofilter cells, individually or as a unit.

The solid membrane electrode assembly of the present invention preferably contains an ion-selective membrane shell material. A preferred membrane material for the dewatering of clay particles is Nafion ™, a perfluorocarbon sulfonic acid solid polymeric electrolytic material, sold by E. I. DuPont de Nemours and Co. For dewatering purposes, the membrane shell material is preferably structured into a "U" shape.

A conductive metal composite layer is bonded to or coated on the interior walls of the solid polymeric membrane material of the present invention. Metals and alloys of platinum, rhodium, palladium and other Group VIIIB metals are particularly useful in the composite layer of the present invention.

The inner core material of the electrode assembly of the present invention comprises a structural and conductive core material such as graphite. An electrically conductive terminal is positioned in the core material for connection to an electric current source.

The electrofilter of the present invention is an improvement over the prior art due to its improved electrode assembly. This electrode assembly is inexpensive, easy to manufacture and operate and requires replacement less frequently than prior art electrode assemblies due to a lower corrosion rate.

DESCRIPTION OF THE PREFERRED EMBODIMENT

Figure 2:
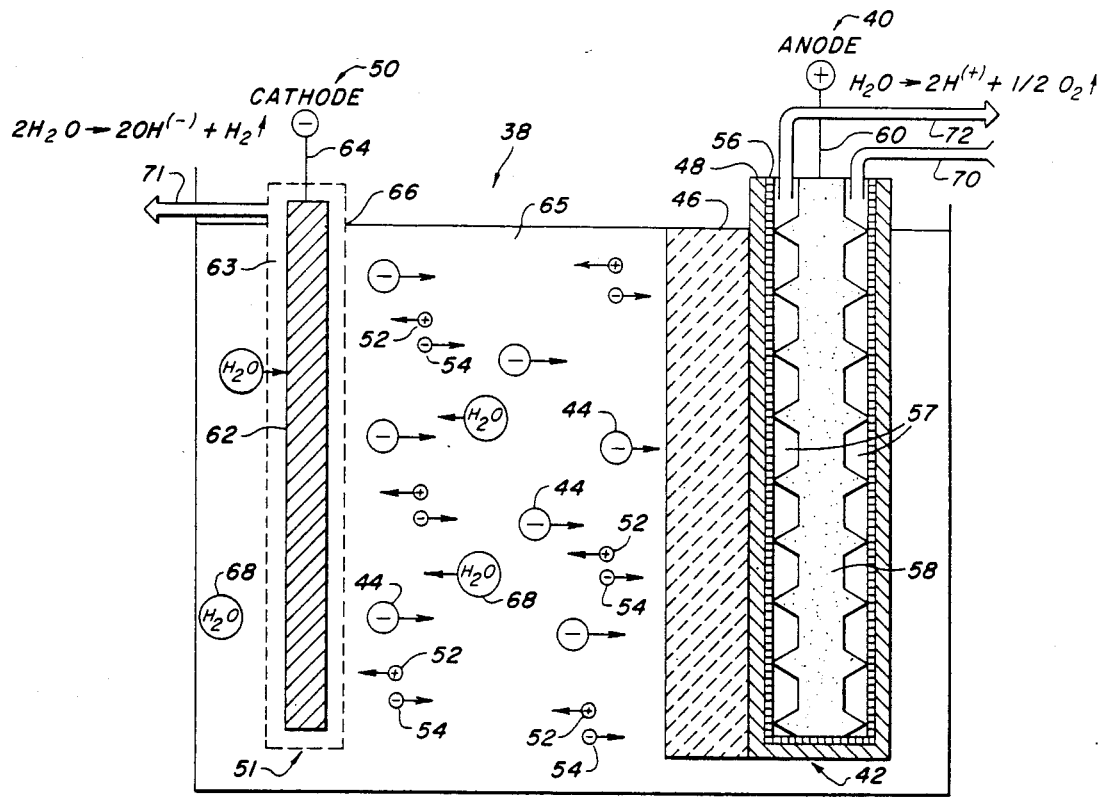
FIG. 2 is a cross-sectional representation of an electrofilter with an electrode assembly of the present invention at the anode position, and illustrating the formation of a dewatered filter cake on the electrode assembly.

The present invention relates to an electrofilter which can be used for the dewatering or separation of particles in a liquid or colloidal suspension. Referring to FIG. 2, the electrofilter 38 has an improved membrane electrode assembly 40 comprising an ion-selective solid polymeric membrane film 48 which is coated with or has bonded on its interior, a conductive metal composite layer 56 structurally supported by a conductive core material 58.

The electrofilter of the present invention contains at least one membrane electrode assembly of the type described above. Other types of electrodes common to the art may be employed as the counter electrode to the membrane electrode assembly. There may be several electrode assemblies and/or counter electrodes, preferably positioned in series, which may be removed individually or as a unit from the electrofilter cell.

The solid membrane electrode assembly 40 of the present invention preferably contains an ion-exchange membrane 48 as a solid polymer electrolyte. For the purposes of dewatering of a liquid or colloidal suspension, the membrane material should be ion-selective so that the ions from the hydrolysis reaction, for example the H ions, may migrate towards the counter electrode, for example, the cathode, through the membrane wall. Such an ion-selective membrane should prevent, to the greatest extent possible, the entry of small clay particles or water into the inner compartment of the electrode assembly. The preferred membrane 48 is a stable, hydrated membrane which selectively transports cations and is substantially impermeable to the flow of liquid. Two well known classes of ion exchange resins which may be fabricated into membranes to provide selective transport of the cation are the sulfonic acid cation exchange resins and the carboxylic cation exchange resins. In the sulfonic acid exchange resins, the ion exchange groups are hydrated sulfonic acid radicals ($SO_3H.x-H_2O$) which are attached to the polymer backbone by sulfonation.

A preferred anode membrane material 48 for the dewatering of clay particles is Nafion TM, a membrane made from hydrated copolymers of polytetrafluoroethylene (PTFE) and polysulfonyl fluoride vinyl ether containing pendant sulfonic acid groups, and sold by E. I. DuPont de Nemours and Co. For dewatering purposes, the membrane material is preferably structured into a "U" shaped shell so that a cake or slurry layer of consistent shape and thickness may be formed. Other structural shapes may be utilized in accordance with the purposes of the specific electrofiltering operation.

A conductive metal composite layer 56 is bonded to or coated on the interior walls of the solid polymeric membrane material 48 of the present invention to form an electrode. Highly conductive metal oxides and alloys of platinum, rhodium, palladium, or other Group VIIIB metals and/or valve metals such as niobium, tantalum, zirconium, hafnium, titanium, and other Group IB metals which are resitant to oxidation are particularly useful in the composite layer of the present invention. The metal particles may optionally be bonded with a hydrophobic material such as Teflon TM or other binders or extenders.

Specific metal composite materials which are useful for the purposes of the present invention are described in U.S. Pat. No. 4,191,618, to Coker et al. and in U.S. Pat. No. 4,328,086, to Takenaka et al. The composite material may be bonded with a polymer such as a fluorocarbon, as disclosed in the U.S. Pat. No. 4,191,618. U.S. Pat. No. 4,328,086 describes a method for embedding the catalytic metal composite material into a membrane material, and in particular, into Nafion TM, by the use of a low-temperature gas plasma. Other methods, common to the art, may be employed to bond the composite coating layer to the membrane material.

The inner core material 58 of the electrode assembly of the present invention comprises a structural and conductive core material such as a polymer reinforced graphite, a resin impregnated graphite, or graphite. This core material serves to conduct and distribute electrical current from the boundary of the cell to the solid polymer electrode. The material must have a minimum of contact resistance at the solid polymer electrode so that in the preferred embodiment only point contact is made with the ion-exchange membrane. This material may also serve to distribute and diffuse electrolyte in the anolyte compartment so as to avoid concentration polarization, the buildup of stagnant gas and liquid pockets, and the buildup of solid deposits such as sodium hydroxide.

Graphite is a particularly useful material for the electrode assembly 58 of the present invention because it is relatively inexpensive, has a good conductivity and ability to distribute charge, does not corrode or dissolve easily, and may be obtained in a variety of forms. Other materials may be used as a substitute to or in addition to graphite, such as a metal felt or screen, a graphite screen, or conductive clips on a solid graphite core. An electrically conductive terminal is positioned in the core material for connection to an electric current source.

Suitable polymer reinforced graphite structures are available from Union Carbide Corporation under the trade name of Karbate. This material is graphite impregnated with a chemically resistant synthetic resin which is chosen for the specific chemical environment in which the electrode will be operated. The resin also renders the graphite impervious to fluids and increases its strength substantially. In a continuous dewatering operation, the liquid passing through the membrane wall may be removed as the filtrate. Removal of this filtrate may be performed by employing a vacuum or by other means common to the art.

A counter electrode which is useful in a dewatering operation in accordance with the present invention consists of an electrode element surrounded by a filter cloth or liquid-porous membrane material. The electrode element is a conductive material, and is attached to an electrically conductive terminal for connection to an electric current source. The filter cloth or liquid-porous membrane should be selected to allow the liquid in the suspension to pass through the membrane, while preventing the particles in suspension, such as clay particles, from passing through the membrane wall. Membrane materials which are useful for a counter electrode are filter cloths such as dynel, polypropylene and rayon.

Alternatively, microporous membranes such as polysulfone, Kynar (polyvinylidene fluoride), polyvinyl chloride, and other organic polymers which have appropriate chemical resistance can be used. A third class of materials would be Ultrafiltration membranes similar to those disclosed in U.S. Pat. No. 3,615,024 issued Oct. 26, 1971 to A. S. Michaels.

Filtration may be further improved or augmented by maintaining a pressure differential across the liquid porous cathode membrane. Methods for applying and sustaining such a differential are well known to those skilled in the art.

The electrofilter of the present invention is an improvement over the prior art due to its improved electrode.

Figure 1:
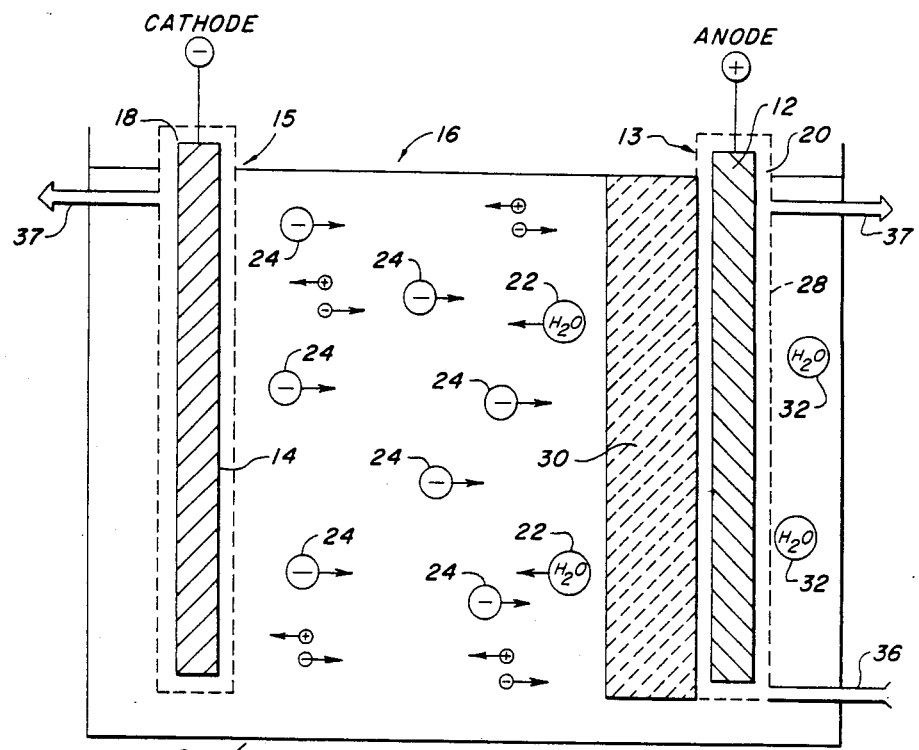
FIG. 1 is a cross-sectional representation of a prior art electrofilter with a coated titanium electrode with a Nafion ™ membrane shell and illustrating the formation of a dewatered filter cake on the shell.

An example of a prior art cell for dewatering a suspension of kaolin clay in water is shown in FIG. 1. A rectangular treatment vessel 10 contains a pair of metal electrodes comprising an anode 13 and a cathode 15. The electrodes are vertical and extend laterally across the vessel 10 to define a treatment zone 16.

The anode assembly 13 is composed of a titanium electrode 12 covered with an acid and oxidation resistant metal alloy coating, and is protectively located with a Nafion TM membrane shell 28 which defines an anolyte compartment 20 which is filled with anolyte. The anolyte enters the anode compartment 20 through port 36 and is removed through port 37. The anolyte provides an electrically conductive path between the anode 12 and the membrane 28 while providing a protective environment for the metal alloy coating on the titanium electrode 12.

The cathode assembly 15 is composed of a conductive metal cathode 14 covered by a liquid porous membrane 26 such as Dynel TM, fabric filter cloth, a microporous membrane, or an ultrafiltration membrane which defines the filtrate chamber 18. Filtrate is removed from the cathode assembly 15 through port 34.

A sufficient quantity of liquid suspension is pumped into the treatment zone 16 to at least partially fill the vessel 10 and provide a path for the electric current between the anode 12 and cathode 14.

When an electric potential is applied to the electrodes, an electric current begins to flow. Negatively charged particles 24 in the treatment zone 16 move electrophoretically toward the anode assembly 13 and deposit on the membrane 28 forming an anode cake 30. Simultaneously, liquid 22 is electro-osmotically pumped out of the anode cake 30, dewatering the cake further. Vacuum is applied to the cathode filtrate port 34. Liquid 22 is transported from the separation chamber 16 through the cathode liquid porous membrane 26 into the filtrate chamber 18 by the combined forces of vacuum filtration and electro-osmotic pumping.

The collected solids material is removed periodically from the anode membrane 28 so the collection/concentration process may be repeated.

FIG. 2 illustrates the electrofilter 38 of the present invention and shows an electrode assembly 42 at the anode position 40. It should be noted that the electrode assembly 42 may be used either as an anode 40, or a cathode 50, or both. For the dewatering of certain kaolin clay particles 44, which have a negative charge (as illustrated by the larger circles in the drawing), the electrode assembly 42 is placed as an anode 40, which has a positive charge, so that the clay particles 44 will migrate towards the electrode assembly 42 and deposit as a cake layer 46 on a membrane material 48 when a direct current is applied to the electrofilter 38. If the particles in suspension are positively charged, the electrode assembly 42 should be positioned at the cathode 50, which has a negative charge so it can attract the positively charged particles. If the liquid or colloidal suspension contains both positively and negatively charged particles, it is possible to employ an electrode assembly 42 at both the cathode 50 and anode 40 positions for the separation and deposition of the various particles.

The electrode assembly 42 of the present invention contains an outer shell layer of a membrane material 48, with an interior coating or bonded layer 56 of conductive metal composite particles. This composite shell, formed by membrane 48 and inner coating 56, is structurally supported by a conductive material 58, which gives the electrode assembly 42 its shape and support and acts as a conductor or distributor for the electric current. The anode chamber 57 is filled with water through port 70. An electrically conductive terminal 60 is positioned in the conductive core material 58, to be connected to an electric current source. Port 72 is used to vent the gaseous reaction products.

The preferred counter electrode or cathode assembly 51 of the present invention, for a dewatering operation of negatively charged particles, consists of a conductive electrode element 62 which is attached to a conductive terminal 64, for connection with an electric current source. A filter cloth or liquid-porous membrane 66 may be positioned around the cathode electrode element 62 to prevent fine particles in the suspension from reaching the filtrate chamber 63 while allowing the carrier liquid or filtrate 68 to pass through the membrane wall 66 into the filtrate chamber 63. The filtrate 68 may be removed through a port 71 at the cathode assembly 51 as the electrolytic reactions proceed and as a cake or slurry layer 46 builds up on the electrode assembly 42.

In a clay dewatering operation, an electric potential is applied to the electrofilter 38 of the present invention by contacting the positive terminal of a power supply to the graphite current distributor 58 at terminal 60, and contacting the negative terminal of the power supply to the cathode 62 at terminal 64. The resulting electrical circuit allows current to flow through the graphite distributor 58 into the metal catalyst 56 which are in intimate contact. Water is circulated through chamber 57 by entering port 70 and leaving port 72. Oxygen is generated at the catalyst surface 56 and swept away by the circulating water in chamber 57, to be removed through port 72. The hydronium ions are transported coulombmetrically through the membrane 48 across the separation chamber 65 through the porous membrane 66 into the cathode filtrate chamber 63 where they are removed with the filtrate through port 71.

Concurrently, due to the electric current flow, the cathode reaction liberates hydroxyl ions and hydrogen gas at the cathode 62. The gas is swept out of the filtrate chamber 63 with the filtrate through port 71. Depending on the conditions of operation, the hydroxyl ions are either swept out of the cathode chamber with the filtrate, neutralized by the hydronium ions transported into the filtrate chamber through membrane 66, or back diffuse into the separation chamber where they then neutralize hydronium ions.

Other dissolved ionic species will be transported across the separation chamber according to their charge. Hydronium ions and other positively charged ions 52 migrate away from the anode toward the cathode. Hydroxyl and other negatively charged ions 54 migrate toward the anode 40 and away from the cathode 50.

If the equipment is designed to form a cake on the anode assembly 42, then after a cake 46 of sufficient thickness has deposited on the membrane 48, the anode assembly 42 is removed from the electrofilter cell 38 so that the cake layer 46 can be removed from the membrane 48. After which, the anode assembly 42 is returned to the cell 38 so that the deposition process can continue. The electrofilter cell 38 may contain several electrode assemblies which may be removed individually or as a unit. One such system designed for cake removal is exampled in U.S. Pat. No. 4,107,026.

The electrode assembly of the present invention may be taken out of the electrofilter for periodic removal of the cake or slurry and for electrode replacement. Removal of the cake or slurry may be performed by scraping, spraying, doctoring, or by other means common to the art. There may be several such electrode assemblies, preferably positioned in series, which can be individually removed, or removed as a unit. A grid or screen may be positioned on the outer face of the membrane material so the membrane will not be damaged when the filter cake or slurry is removed.

Alternatively, if the equipment is designed to concentrate a slurry or colloidal suspension, then the membrane surface 48 is flushed with material in the separation chamber to limit or prevent cake buildup. The preferred direction of flow of feed material for preventing cake buildup is parallel to the surface of the solid polymeric electrode. Feed material may be used to flush the membrane surface at either its original concentration of solids or after removal of liquid has increased the percent solids in solution or suspension.

The electrofilter of the present invention is subjected to an electric current by means of the terminal connections with the electrode assembly and counter electrode. The current may be varied to increase or decrease the filtering rate.

Accordingly, it has been discovered that an electrofilter with an improved electrode assembly comprising an ion-selective membrane material shell, said membrane material being bonded or coated on its interior with a metal composite layer, and a conductive structural material core provides an inexpensive and efficient system for separating or dewatering particles from a liquid or colloidal suspension. This electrode assembly does not corrode or dissolve easily, and involves relatively few operating difficulties.

While the invention has been described with reference to its preferred embodiment, other embodiments can achieve the same results. Variations and modifications of the present invention will be obvious to those skilled in the art and it is intended to cover in the appended claims all such modifications and equivalent as follows in the true spirit and scope of this invention.

I claim:

1. An electrofiltration device for dewatering or separating particles in a slurry, dispersion, or colloidal suspension comprising
   a treatment vessel for containing a slurry, dispersion or colloidal suspension to be treated,
   an electrode and a counter-electrode within said treatment vessel, said electrode and counter-electrode being spaced apart and defining a treatment zone therebetween,
   wherein said electrode is an electrode assembly comprising a U-shaped ion-selective membrane shell including a catalytic material coating bonded to its interior, wherein the catalytic material is a metal selected from the group consisting of Periodic Table Group VIIIB metals, Periodic Table Group IB metals, highly oxidation resistant valve metals, metal oxides and mixtures thereof, and an electric current distributor which contacts said catalytic coating to distribute current to said coating, said distributor also providing support for said U-shaped shell.

2. An electrofiltration device in accordance with claim 1 wherein the membrane comprises an ion exchange resin.

3. An electrofiltration device in accordance with claim 1 wherein said electric current distributor comprises a material selected from the group consisting of graphite, resin impregnated graphite, and polymeric resin impregnated graphite.

4. An electrofiltration device according to claim 1 further comprising means for preventing buildup of particles on the surface of the solid polymeric electrodes.

5. An electrofiltration device according to claim 4 wherein said means for preventing buildup of particles comprises means for flowing concentrated feed material onto the surface of the solid polymeric electrode.

6. An electrofiltration device in accordance with claim 1 further comprising a liquid porous membrane around said counter-electrode.

7. An electrofiltration device in accordance with claim 6 further comprising means for maintaining a pressure differential across the liquid porous membrane.

8. An electrofiltration device in accordance with claim 6 further comprising means for removing liquid between said counter-electrode and said liquid porous membrane.

9. A method for the dewatering or separating of particles in a particle containing liquid comprising
   providing an electrofiltration device comprising at least one polymeric electrode assembly, wherein said assembly comprises an ion-selective membrane comprising a catalytic material and an electric current distributor, wherein said membrane contacts said electric current distributor, and at least one counter-electrode;
   adding a particle containing solution to said electrofiltration device; and
   applying an electric current to said electrode assembly and said counter-electrode.

10. The method of claim 9 further comprising collecting particles on said solid polymeric electrode assembly.

11. The method of claim 10 further comprising removing the collected particles from said solid polymeric electrode assembly.

12. The method of claim 9 further comprising preventing the buildup of particles on the surface of said solid polymeric electrode.

13. The method of claim 12 wherein the particles are prevented from building up on the surface of said solid polymeric electrode by flowing concentrated feed material parallel to the surface of said solid polymeric electrode.

14. The method of claim 9 further comprising maintaining a pressure differential across a liquid porous cathode membrane.

15. The method of claim 9 further comprising providing a catalytic material selected from the group consisting of Periodic Table Group VIIIB metals, Periodic Table Group IB metals, highly oxidation resistant valve metals, and metal oxides and attaching said catalytic material to said solid polymeric electrode assembly.

16. The method of claim 9 further comprising providing means for the continuous addition of said particle containing solution and means for removing the liquid separated from said particles containing solution, and
   adding said particle containing solution to said electrofiltration device while removing said separated liquid.

17. The method of claim 9 further comprising providing a liquid-porous membrane at said counter-electrode.

18. The method claim 17 further comprising providing means for removing liquid separated from said particle containing liquid between said counter-electrode and said liquid/porous membrane.

19. The method of claim 18 further comprising continuously adding said particle containing liquid to said electrofiltration device and withdrawing the liquid separated from said particle containing liquid, wherein said particle containing liquid is added at the same rate at which said separated liquid is withdrawn.

* * * * *